(No Model.)
J. J. HOGAN.
SHAFT COUPLING.
No. 459,909. Patented Sept. 22, 1891.
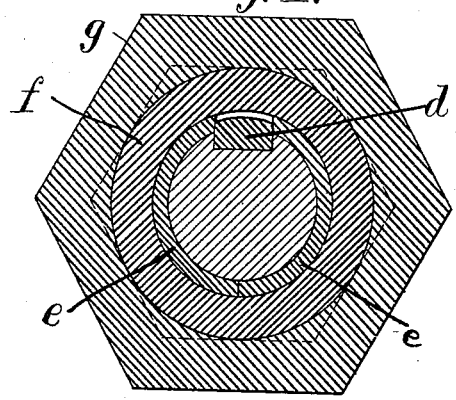
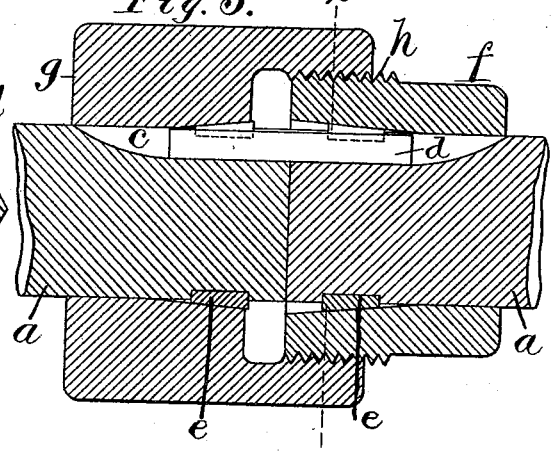
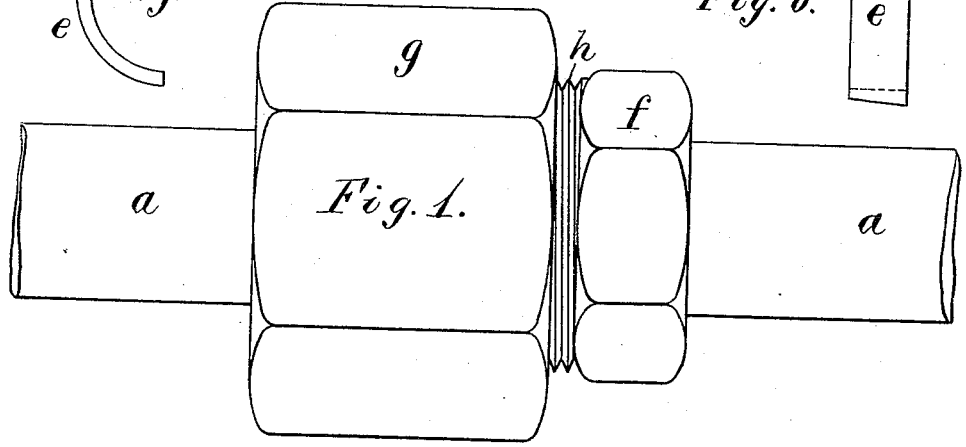
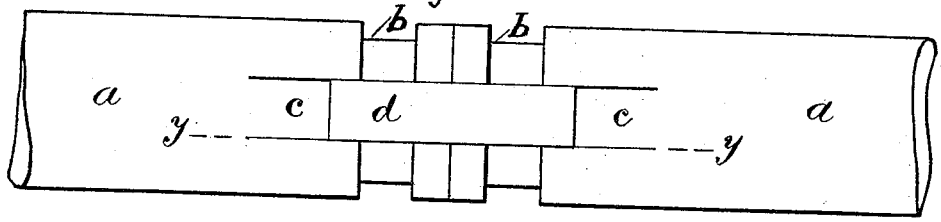
Attest:
L. Lee.
F. C. Fischer.
Inventor:
John J. Hogan, per
Crane & Miller, attys.

UNITED STATES PATENT OFFICE.

JOHN J. HOGAN, OF BROOKLYN, ASSIGNOR TO THE HOGAN ENGINEERING COMPANY, OF NEW YORK, N. Y.

SHAFT-COUPLING.

SPECIFICATION forming part of Letters Patent No. 459,909, dated September 22, 1891.

Application filed November 15, 1889. Renewed March 9, 1891. Serial No. 384,375. (No model.)

*To all whom it may concern:*

Be it known that I, JOHN J. HOGAN, a citizen of the United States, residing in the city of Brooklyn, county of Kings, and State of New York, have invented certain new and useful Improvements in Shafting - Couplings, fully described and represented in the following specification and the accompanying drawings, forming a part of the same.

This invention is intended for coupling shafts together to transmit rotary force, and is adapted not only to transmit the torsion of one shaft to another, but to draw the ends of the shafts into firm contact with one another.

In the drawings, Figure 1 is an external view of two shaft ends united by my coupling. Fig. 2 is a plan of the shaft ends and their coupling-key with the sleeves removed. Fig. 3 is a plan of the shaft ends and coupling, taken on line $y\ y$ in Fig. 2. Fig. 4 is a transverse section of the entire coupling on line $x\ x$ in Fig. 3. Fig. 5 is a side view of one portion of the coupling-collar, and Fig. 6 is an edge view of the same.

$a$ are the shaft ends, provided each near its end with an annular groove $b$, of rectangular shape, and with a key-seat $c$, adapted to fit a key $d$, which is made of suitable thickness to fill the seat to its top. Collars $e$, formed in two parts, are fitted within each of the grooves, with two of their ends adjacent to the sides of the key. The collars are formed with a conical exterior enlarged toward the end of the shaft. Sleeves $f$ and $g$ are fitted to the shafts and provided at their adjacent ends with conical seats fitted to the exterior of the collars $e$, and the sleeves are shown provided, respectively, with external and internal threads $h$ for drawing the sleeves toward one another. Such a movement of the sleeves compresses the collars $e$ tightly into the grooves $b$ and at the same time forces the ends of the shafts into close contact with one another, while the key $d$ is also held firmly in the seat $c$, and thus prevents one shaft from turning out of the other. The sleeves are also shown provided externally with hexagon bodies adapted to receive a wrench for screwing them together; but as flanges provided with bolts and nuts have long been used as an equivalent for such screw-threads it is obviously immaterial how the sleeves are drawn together, as the essential part of the invention consists in the combination of the sleeves with the collars and the grooved ends of the shafts provided with the key $d$.

Having thus set forth my invention, what I claim herein is—

In a shaft-coupling, the combination, with the shafts whose ends are provided with grooves $b$ and with key-seats $c$, of the key $d$ inserted in the said seats, the conical collars inserted in the grooves, and the sleeves, each provided with a tapering seat to fit the exterior of the collars and with means for drawing the sleeves together, substantially as herein set forth.

In testimony whereof I have hereunto set my hand in the presence of two subscribing witnesses.

JOHN J. HOGAN.

Witnesses:
C. E. CADY,
THOS. S. CRANE.